(12) United States Patent
Kassam et al.

(10) Patent No.: US 8,119,200 B2
(45) Date of Patent: Feb. 21, 2012

(54) METHOD FOR MANUFACTURING A FLEXIBLE AND BREATHABLE MATT FINISH GLOVE

(75) Inventors: Mikhail Kassam, Toronto (CA); Akil Jaffer, Markham (CA); Jamshed Amjad, Karachi (PK); Basheer Ali, Karachi (PK)

(73) Assignee: Midas Safety Inc., Toronto (CA)

( * ) Notice: Subject to any disclaimer, the term of this patent is extended or adjusted under 35 U.S.C. 154(b) by 357 days.

(21) Appl. No.: 12/428,668

(22) Filed: Apr. 23, 2009

(65) Prior Publication Data

US 2010/0104750 A1   Apr. 29, 2010

Related U.S. Application Data

(63) Continuation-in-part of application No. 12/259,656, filed on Oct. 28, 2008.

(51) Int. Cl.
*B05D 3/10* (2006.01)

(52) U.S. Cl. .................. 427/337; 2/159; 2/161.8; 2/164; 2/169; 427/246; 427/336; 427/342; 427/373; 427/389.9; 427/412

(58) Field of Classification Search .............. 2/159–170; 57/159–170, 229; 66/174; 264/232, 603, 264/642, 643; 427/243–246, 258, 261, 288, 427/335–337, 340, 342, 352–354, 372.2, 427/373, 384, 385.5, 389.9, 394

See application file for complete search history.

(56) References Cited

U.S. PATENT DOCUMENTS

| 4,569,707 A | 2/1986 | Johnson | |
|---|---|---|---|
| 2004/0121113 A1* | 6/2004 | Mobley et al. | 428/85 |
| 2004/0221364 A1* | 11/2004 | Dillard et al. | 2/159 |
| 2005/0035493 A1* | 2/2005 | Flather et al. | 264/305 |
| 2007/0204381 A1* | 9/2007 | Thompson et al. | 2/159 |

FOREIGN PATENT DOCUMENTS

WO   WO 2007/070131 A1   6/2007

OTHER PUBLICATIONS

Office Action issued Jul. 21, 2010, in European Patent Application No. 09172796.6-2124.
Extended European Search Report issued Mar. 2, 2010, in European Patent Application No. 09172796.6-2124.

* cited by examiner

*Primary Examiner* — Michael Cleveland
*Assistant Examiner* — Alexander Weddle
(74) *Attorney, Agent, or Firm* — Oblon, Spivak, McClelland, Maier & Neustadt, L.L.P.

(57) ABSTRACT

A method to prepare a flexible and breathable protective glove having excellent grip in both aqueous and oil environments includes coating an electrolyte treated glove liner substrate with a non-foamed dispersion of a polymeric material. The resulting semi-gelled polymeric coating which partially penetrates the depth of the glove liner substrate, is treated with a foamed solution of a surfactant, tenside or aerosol solution and the foam treated coating is overcoated with an electrolyte solution. In a resulting chemical or physical reaction, fine pores and cavities are formed in and on the polymer coating.

14 Claims, No Drawings

METHOD FOR MANUFACTURING A FLEXIBLE AND BREATHABLE MATT FINISH GLOVE

BACKGROUND OF THE INVENTION

1. Field of the Invention

The present invention relates to a method for the manufacture of a flexible and breathable matte finish glove.

2. Discussion of the Background

Gloves can provide important protection to the hands in many industrial or household tasks. Often such tasks are performed in fluid environments where not only protection from such materials as water, aqueous solutions of various degrees of alkalinity or acidity, oil, gasoline or similar materials is required, but also an ability to grip and securely hold or maneuver an object is necessary. For such purposes, the gloves should be comfortable, flexible, provide breathability and provide a grip surface capable of secure grip even when exposed to materials having lubricity which would adversely affect an ability to securely grip an object.

Johnson (U.S. Pat. No. 4,589,940) describes methods for preparing slip resistant articles such as work gloves by laminating a foamed material to a substrate. The foamed material may be polyurethane, polyvinyl chloride, acrylonitrile, natural rubber or synthetic rubber and the level of foam is adjusted according to the required degree of abrasion resistance.

Watanabe (U.S. Pat. No. 4,497,072) describes a method for making a porous hand covering by coating a fabric glove base with a foamed rubber or resin and subjecting the foam coated glove base to sufficiently reduced pressure to cause bursting of the foam bubbles to form a coating surface with a plurality of depressions.

Heeter et al. (U.S. Pat. No. 5,322,729) describes a method and apparatus for producing a breathable coated fabric. The method includes coating a fabric substrate with a resin then opening pores in the resin by directing a flow of air through the fabric substrate and resin coating.

Yamashita et al. (U.S. Pat. No. 6,527,990) describes a method to produce a rubber glove by sequentially performing the step of immersing a glove mold in a coagulating synthetic rubber latex containing synthetic rubber in latex form, thermally expandable microcapsules, and a rubber coagulant to form a coagulant-containing synthetic rubber film on the surface of the glove mould; the step of immersing the glove mold in rubber-incorporating latex to form a gelled rubber layer; the step of heating a rubber laminate composed of the synthetic rubber film and the gelled rubber layer to vulcanize the rubber laminate; and the step of turning the vulcanized rubber laminate inside out, and removing it from the glove mold.

Borreani et al. (U.S. 2002/0076503) describes a clothing article such as a glove characterized in that: the textile support receives an adherence primer in the form of an aqueous calcium nitrate; the textile support with the adherence primer is subjected, entirely or partially, to a coating based on a foamed aqueous polymer; the foamed aqueous polymer only appears on the support outer part without going through the mesh so as not to produce contact with the corresponding part of the body.

Dillard et al. (U.S. 2004/0221364) describes methods, apparatus, and articles of manufacture for providing a foam glove, including coating a textile shell with a foamed polymeric coating that is supported in part by the surface of the textile shell. Sufficient amount of air is mixed with the base polymer to lower the density of the base polymer to between about 10 to 50% of the original density of the base polymer.

Flather et al. (U.S. 2005/0035493) describes a glove having a textured surface or textured foam coating produced by embedding a layer of discrete particles, such as salt, into a previously formed liquid layer, gelling or curing the layer and dissolving the discrete particles to leave a textured or textured foamed surface.

Thompson et al. (U.S. 2007/0204381) describes a lightweight thin flexible latex glove article having a polymeric latex coating that penetrates the front portion of a knitted liner half way or more through the liner thickness and for at least a portion of the knitted liner, not penetrating the entire thickness. For example, the liner can be knitted using an 18 gauge needle with 70 to 221 denier nylon 66 multi-filament yarn. The polymer latex coating can be 0.75 to 1.25 times the thickness of the knitted liner. The polymer latex coating may be foamed with 5 to 50 vol % air content. Open celled foamed latex coating may be coated with a dispersion of fluorochemical dispersion to prevent liquid permeation into the glove. The process can include steps to gel the latex emulsion at interstices of the yarn to prevent further penetration of the emulsion into the liner.

In view of the foregoing, there is a need in the art for a facile and economical method to manufacture a comfortable, breathable and flexible matte finish glove providing protection from both aqueous and oil environments, and having improved water and oil grip.

SUMMARY OF THE INVENTION

One object of the present invention is to provide a method for the manufacture of a matt finish glove with improved water and oil grip that is both flexible and breathable, and may be liquid proof.

A further object of the present invention is to provide such a method that produces a glove having a spongy and permeable coating which allows a desired dexterity.

These and other objects of the present invention, either individually or in combinations thereof, have been satisfied by the discovery of a method for preparing a flexible, liquid absorbent coated glove, comprising:

coating a glove liner fitted onto a glove mould, with a foamed or non-foamed electrolyte solution;

at least partially drying the coated glove liner fitted onto a glove mould;

applying a non-foamed dispersion of a polymeric material to a selected portion of the dried electrolyte solution coated glove liner fitted onto a glove mould, by immersion in tank(s) containing the non-foamed dispersion(s) of polymeric material, with or without applying foamed or non-foamed electrolyte solution(s) with some intermediate stages of gelling, so that the polymeric material penetrates partially through a thickness of the glove liner and for at least a portion of the liner, the polymeric material does not fully penetrate the glove liner;

coating the polymeric material treated area of glove liner fitted onto a glove mould with a foam layer of a solution comprising at least one selected from the group consisting of a surfactant, a tenside and an aerosol;

applying an aqueous or alcoholic solution of an electrolyte;

placing the treated glove liner in a diffusion bath;

heating the treated glove liner, after removal from the diffusion bath, to a temperature to vulcanize or to stabilize the polymeric coating to form a glove comprising a liner adhered to polymer cured coating fitted onto a glove mould.

DETAILED DESCRIPTION OF THE PREFERRED EMBODIMENTS

The liner of the present invention may be prepared from any appropriate flexible material. The choice of material selected will depend the end requirements of the glove and the utility for which the glove is intended. Comfort and designed resistance to cutting, puncturing and abrasion must be considered when selecting the material of construction for the liner.

Any suitable flexible material may be selected as the yarn for the liner and suitable materials include, for example, cotton, polycotton, steel, glass, polyaramid, wool, polyamide, high tenacity polyamide, polyester, polyethylene, ultra high molecular weight polyethylene (UHMWPE), bamboo fiber, silver, carbon, copper, spandex, lycra, acrylic, polyvinyl alcohol, hemp, VECTRON or combinations of any of these materials. An example of a preferred polyaramid is KEVLAR® while fibers sold under the trade name DYNEEMA® is a preferred UHMWPE.

Yarns of these materials may be formed into the fabric of the liner by any method known in textile art. Suitable liners include, but are not limited to, knitted, woven, non-woven and fiber flock (flocculated fibers) liners, preferably knitted. These yarns may be treated with anti-microbial agents and/or nanotechnology methods.

The liner is preferably knitted with large hook needles such as a 15 gauge needle. The denier of the yarn is in the range of from 100 to 4500, preferably 100 to 600 and most preferably 280 to 420. The yarn may be may be passed through a bath of silicone free mineral oil to provide lubricity to the needle latches during the knitting process.

Generally in the knitting of the preferred liner, the stitch density of the glove is set and controlled by adjustment of the stitch control motor. The stitch density at all knuckle joints may be relaxed to allow flexibility for finger movement. At the lower palm the stitch density may be tightened gradually to conform with the shape of a hand. The finger tip portion of the glove may be rounded by electronic control of the knitting process.

The mould which is inserted into the hand shaped liner to form the substrate treatment unit may be constructed of any material suitable for this purpose which is stable to the treatment chemicals and temperatures employed in the process to which the mould is exposed. For purposes of description clarity herein, a mould to which the glove liner is fitted by insertion of the mould into the liner is referred to as the "substrate treatment unit" and may be referred to herein as the "unit" or "treatment unit."

The initial electrolyte treatment of the treatment unit may be accomplished by any desired method, including, but not limited to, dipping, spraying, contact transfer such as by a sponge, etc. Preferably, the electrolyte treatment is accomplished by dipping the treatment unit into a tank containing a solution of the electrolyte or a solution of the electrolyte may be spray coated onto the treatment unit. Suitable electrolytes include organic acids, for example, formic acid, citric acid and acetic acid, inorganic acids, alkali metal salts, alkaline earth metal salts and transition metal salts. Combinations of these electrolytes may be used. Preferred electrolytes are acetic acid, citric acid, formic acid, calcium nitrate and calcium chloride. Most preferred electrolytes are calcium nitrate and acetic acid.

The electrolyte is dissolved in water, an alcohol or an aqueous alcohol mixture. Preferred alcohols are those having 1 to 12 carbons. Preferably alcohols having 1-6 carbons and most preferably alcohols having 1-4 carbon atoms are used. For application to the treatment unit the electrolyte solution may be foamed or non-foamed, preferably non-foamed.

For the purposes of this invention, the electrolyte solution may completely or incompletely penetrate the thickness of the liner. After application of the electrolyte solution to the liner of the treatment unit, the treatment unit is partially dried to remove at least a portion of the solvent, while retaining electrolyte within the penetrated depth of the knitted liner.

The polymeric material applied from the polymeric dispersion may be at least one of natural rubber, synthetic polyisoprene, styrene-butadiene copolymer, acrylonitrile-butadiene copolymer, carboxylated acrylonitrile-butadiene copolymer, polychloroprene, polyacrylate, butyl rubber, polyvinyl chloride, polyvinyl acetate, polyethylene, water-based polyester-based polyurethane, water-based polyether-based polyurethane, cross-linked sodium carboxymethylcellulose and solvent based polyurethane.

The aqueous dispersion of the polymeric material is non-foamed. The solids content of the dispersion is in the range from 10 to 70% by weight, preferably 20 to 60% by weight, and most preferably 25 to 45% by weight. The dispersion may be stabilized with compounds such as sulphur, zinc oxide and metal alkyl carbamates or other stabilizers. The emulsion may contain other ingredients conventionally known in the art and may include surfactants, anti-microbial agents and fillers.

The viscosity of the polymeric dispersion is controlled by adjustment of the solids content, dispersing agents, additives such as thickeners and/or rheology control agents and dispersion medium as known to one skilled in the art and may be in the range of 100 to 20000 centipoise, preferably 250 to 15000 centipoises, and most preferably 500 to 3000 centipoise. The viscosity may be adjusted to assist the control of the depth of penetration of the polymer dispersion into the knitted liner.

When the non-foamed polymeric dispersion is applied to the electrolyte treated glove liner, the dispersion will penetrate the liner to a depth determined by the viscosity of the polymer dispersion, the length of time the treatment unit remains in the dipped state and the concentration of electrolyte at a given depth into the glove liner. As the polymeric dispersion encounters electrolyte upon penetration, it coagulates or gels due to the influence of the electrolyte and deeper penetration is diminished.

In an alternative embodiment, a two layer liner is formed. In this embodiment, prior to the step of applying the foamed or non-foamed polymeric material, the at least partially dried electrolyte solution coated glove liner fitted onto a glove mould is coated with an airless latex dip to form a layer impermeable to oils and chemicals, as described in U.S. Pat. No. 7,310,826, the contents of which are hereby incorporated by reference.

Due to the coagulation effect of the electrolyte upon the polymeric dispersion, at least 20% of the interior of the glove liner substrate is not penetrated to the skin contacting surface, preferably at least 50% of the interior is not penetrated to the skin contacting surface, most preferably at least 80% is not penetrated to the skin contacting surface and ultimately preferred, substantially no penetration to the skin contacting surface occurs.

Since with increasing distance of the polymeric material from the surface of the liner the opportunity to encounter electrolyte significantly decreases, the extent of gelling also gradually decreases with distance from the liner so that the outer surface of the polymeric material remains not gelled or only partially gelled.

An important aspect of the present invention is the creation of a polymeric material layer having foam characteristics without the use of a foamed dispersion of the polymeric material itself. The foam characteristics are provided by the application of a foam layer of a solution of a surfactant, tenside and/or aerosol such that the foam layer impinges against the still wet polymeric material layer, creating a foamed appearance to the polymeric material (i.e. the bubbles of the foam push against the polymeric material layer to create impressions, thus giving the polymeric material layer characteristics of a foamed layer).

The surfactant, tenside and/or aerosol may be any such chemicals known to one of skill in the art. Examples include, for example, sodium linear alkyl benzenesulfonates, quaternary ammonium salts, carboxylates, sulfates, betaines, fatty acids and poly glycol ethers. Combinations of these may be employed as determined by one of skill in the art in order to achieve selected and desired effects on the polymer coating.

The surfactant, tenside and/or aerosol solution may be in water or aqueous alcohol mixtures, preferably in water. In the case of aqueous alcohol mixtures, alcohols having 1-12 carbons are used. Preferably alcohols having 1-6 carbons and most preferably alcohols having 1-4 carbon atoms are used. Methanol, ethyl alcohol, propanol and isopropanol are most preferred. The alcohol water composition may be of any water alcohol ratio depending on the surfactant, tenside or aerosol used and the desired effect on the polymeric material.

The foamed surfactant, tenside and/or aerosol solution may contain a soap and a gelling aid such as cellulose or a cellulose derivative. Benzyl alcohol may be added to assist stabilization and to make grooves which can hold gases.

A change in the appearance of the surface of the polymeric coating may be observed during or as a result of the dipping treatment in the diffusion bath.

The second electrolyte treatment of the treatment unit may be accomplished by dipping the treatment unit into a tank containing a solution of the electrolyte. The length of time of the dipping may range from about 1 to about 20 seconds, preferably 1 to 15 seconds and most preferably 1 to 5 seconds.

Suitable electrolytes include organic acids, for example, formic acid, citric acid and acetic acid, inorganic acids, alkali metal salts, alkaline earth metal salts and transition metal salts. Combinations of these electrolytes may be used. Preferred electrolytes are acetic acid, citric acid, formic acid, calcium nitrate and calcium chloride.

The electrolyte is dissolved in water, an alcohol or an aqueous alcohol mixture. Preferred alcohols are those having 1 to 12 carbons. Preferably alcohols having 1-6 carbons and most preferably alcohols having 1-4 carbon atoms are used. For application to the treatment unit the electrolyte solution may be foamed or non-foamed. Foaming may be accomplished as described above.

Although not limited by any expressed theory, the advantage of the present invention is realized in the sequential and combined treatments described in the claims. A physical and/or chemical reaction occurs in the diffusion bath and can be observed at the interface. As a result of this reaction, fine cavities and pores are created in the polymeric coating. The formed pores may extend the entire depth of the polymer coating and provide for the breathability of the glove when construction is complete. The cavities formed on the surface of the polymeric coating provide good grip even in slippery environments such as water, oil or grease.

The obtained polymeric coating on the glove liner substrate may range from about 0.05 mm to 5.5 mm in thickness depending on the desired degree of protection and flexibility. A preferred range of thickness is 0.25 mm to 4.0 mm and a most preferred range is 0.30 to 3.7 mm. The cavities and pores formed in and on the coating are randomly, but uniformly distributed on the surface and throughout the depth of the coating. A large range of cavity and pore density in the polymeric coating is possible depending on the concentration of the salts in the electrolyte solution and the post treatments in the diffusion bath or surfactant solution and the concentration, length of treatment and treatment temperature of the electrolyte overcoating.

The treatment conditions described in the previous paragraph may be varied and controlled to achieve a desired coating morphology by one of skill in the art. According to the claimed invention gloves capable of absorbing one milliliter of water in a range of from about 1 second to about 300 seconds, preferably 1 second to about 250 seconds and most preferably 1 second to about 120 seconds, may be produced. The same gloves are capable of absorbing one milliliter of oil in a range of from about 5 seconds to 500 seconds, preferably 50 seconds to 450 seconds and most preferably 250 seconds to 400 seconds.

Following the electrolyte treatment the treatment units may be hung horizontally or vertically to allow drainage of the liquid treatment solutions. The unit may then be placed in a diffusion bath for one to thirty minutes in order to remove water-soluble residuals. Such residuals may include electrolytes, surfactants and other additives used to promote the formation of the coating morphology. Finally, the treatment unit is placed in a heated environment at a temperature of from 80 to 140° C., preferably 90 to 130° C., and most preferably 100 to 120° C., to fully cure the polymer coating.

The glove liner substrate and applied cured polymeric coating is then removed from the mould to obtain a semi-finished glove, which is washed in an alcoholic bath and/or an aqueous bath. The washed semi-finished glove is coated with a fluorochemical composite dispersion according to conventional methods known to one of skill in the art.

TABLE 1

| Sample | Glove | Dry Grip Metal Rod | Dry Grip Glass Rod | Wet Grip Metal Rod | Wet Grip Glass Rod | Oil Grip Metal Rod | Oil Grip Glass Rod | Water Permeability | Oil Permeability |
|---|---|---|---|---|---|---|---|---|---|
| 1 | NINJA-X* | ***** | ***** | **** | * | *** | ** | 15 sec/ml | 135 sec/ml |
| 2 | TOP FLEX* | ***** | ***** | **** | * | *** | ** | 15 sec/ml | 150 sec/ml |
| 3 | NITRILON* FLEX* | **** | **** | *** | Nil | ** | *** | 15 sec/ml | 360 sec/ml |
| 4 | NITRILON* | ***** | ***** | Nil | Nil | Nil | Nil | Didn't pass through | Didn't pass through |
| 5 | NTF Coating (Invention) | ***** | ***** | **** | ** | *** | ** | 11 sec/ml | 104 sec/ml |
| 6 | MAXI FLEX** | *** | *** | ***** | Nil | Nil | **** | Didn't pass through | Didn't pass through |
| 7 | HyFlex ®*** 11-920 | ***** | **** | ** | Nil | * | Nil | 840 sec/ml | Didn't pass through |

*MIDAS SAFETY INC.
**JOHN WARD CEYLON (PVT) LTD.
***ANSELL

The ratings indicated in Table 1 for grip testing are qualitative and are based on an assessment wherein an individual wearing the glove to be tested, gripped a portion of a one inch diameter test rod which had been dipped in the test medium (water or oil). A second individual, holding a clean portion of the rod, then pulled the rod from the grip held by the glove. The individual who held the rod in the test glove assigned a number represented by the number of "*'s" in the Table, which correlated with the amount of gripping effort required to hold the rod. The higher number of "*", the greater the grip afforded by the glove as assessed by the individual who held the rod in the test glove.

The permeability test was performed by holding a test portion of a glove horizontally and placing one milliliter of the test liquid (water or oil) on the outer surface of the glove. The amount of time required for the liquid to seep from the outer surface side to the inner surface was recorded.

As shown by the data in Table 1, the gloves according to the claimed invention provide overall better grip capability for a metal or glass rod coated with water or oil while simultaneously providing good permeability in comparison with conventional commercial similar style work gloves.

While the invention has been described by the specific embodiments, it is evident that alternatives, modifications and variations thereof, within the scope of the claimed invention, will be apparent to those skilled in the art. The embodiments are exemplary and should not be interpreted to be limiting in scope. Accordingly, all alternatives, modifications and variations which are within the scope of the appended claims are embraced herein.

The invention claimed is:

1. A method for preparing a flexible, liquid absorbent coated glove, comprising:
    fitting a glove liner onto a glove mold to form a treatment unit;
    applying to the glove liner of the treatment unit, an optionally foamed electrolyte solution to obtain a glove liner at least partially penetrated in a thickness direction with the electrolyte solution;
    drying the electrolyte solution penetrated glove liner of the treatment unit to remove at least part of a solvent of the electrolyte solution;
    applying a non-foamed dispersion of a polymeric material to a selected portion of the dried electrolyte penetrated glove liner of the treatment unit, by immersion in tank(s) comprising the non-foamed dispersion(s) of polymeric material,
    penetrating the dispersed polymeric material through at least a part of the thickness of the electrolyte penetrated glove liner such that for at least a portion of the glove liner, the polymeric material does not fully penetrate the glove liner, and wherein the polymeric material gels within the thickness of the glove liner upon encounter with the penetrated electrolyte and remains ungelled on a surface;
    creating impressions in the polymeric material by:
        (I) immersing the treatment unit with the glove liner having ungelled polymeric material on its surface into a tank of a foamed solution consisting of at least one of a surfactant, a tenside, an aerosol, and optionally, a soap, a gelling aid and benzyl alcohol, and
        (II) applying an aqueous or alcoholic solution of an electrolyte to the treatment unit after the immersion treatment to obtain a treated glove liner;
    placing the treated glove liner in a diffusion bath;
    heating the treated glove liner, after removal from the diffusion bath, to a temperature to cure or to stabilize the polymeric coating to form a glove comprising a liner adhered to polymer cured coating fitted onto a glove mould.

2. The method according to claim 1, further comprising prior to applying the non-foamed polymeric material;
    coating the dried electrolyte penetrated glove liner of the treatment unit with an airless latex dip to form a layer impermeable to oils and chemicals.

3. The method of claim 1, wherein the glove liner is a member selected from the group consisting of knitted glove liners, woven glove liners, non-woven glove liners and glove liners formed from fiber flock.

4. The method of claim 3, wherein the glove liner is a knitted glove liner.

5. The method of claim 4, wherein the knitted glove liner comprises a yarn of a denier in the range of from 100 to 4500, having a plurality of stitches.

6. The method according to claim 1, further comprising:
    applying a fluorochemical composite dispersion to an outer surface of the treated glove liner of the treatment unit; and
    heating to dry and cure the applied fluorochemical composite dispersion.

7. The method according to claim 1, wherein the glove liner is formed from a yarn having a denier of from 100 to 4500.

8. The method according to claim 1, wherein the glove liner comprises at least one yarn selected from the group consisting of cotton, polycotton, steel, glass, polyaramid, wool, polyamide, polyester, polyethylene, UHMWPE, bamboo fiber, silver fiber, carbon fiber, copper fiber, spandex, acrylic, high tenacity polyamide, PVA, hemp.

9. The method according to claim 1, wherein the polymeric material of the applied non-foamed dispersion is at least one member selected from the group consisting of natural rubber, synthetic polyisoprene, styrene-butadiene copolymer, carboxylated or non-carboxylated acrylonitrile-butadiene copolymer, polychloroprene, polyacrylate, butyl rubber, polyvinyl chloride, polyvinylacetate, polyethylene, polyester, polyurethane, polyether, sodium carboxymethylcellulose and combinations thereof.

10. The method according to claim 1, wherein a solids content of the non-foamed dispersion of polymeric material is in the range from 10 to 70% by weight.

11. The method according to claim 1, wherein a viscosity of the non-foamed dispersion of a polymeric material is in a range of from 200 to 4000 centipoise.

12. The method according to claim 1, wherein the surfactant, tenside and aerosol is at least one member selected from the group consisting of a sodium linear alkyl benzenesulfonate, a quaternary ammonium salt, a carboxylate, a sulfate, a betaine, a fatty acid and a polyglycol ether.

13. The method according to claim 1, wherein the impressions created in the polymeric material comprise fine pores and cavities which are formed in the polymeric coating by a chemical, physical and chemical and physical reaction due to interaction of the electrolyte solution with the polymeric material coated with the foam layer of a solution comprising at least one selected from the group consisting of a surfactant, a tenside and an aerosol.

14. The method according to claim 1, wherein the polymeric coating applied to the substrate glove liner ranges from about 0.05 mm to 5.5 mm in thickness.

* * * * *